(12) United States Patent
Ishizuka et al.

(10) Patent No.: US 7,895,990 B2
(45) Date of Patent: Mar. 1, 2011

(54) FUEL INJECTION SYSTEM WITH INJECTION CHARACTERISTIC LEARNING FUNCTION

(75) Inventors: Kouji Ishizuka, Kariya (JP); Kouichi Sugiyama, Chiryu (JP); Manabu Tsujimura, Anjo (JP); Tetsuya Ohno, Kiyosu (JP)

(73) Assignee: Denso Corporation, Kariya (JP)

( * ) Notice: Subject to any disclaimer, the term of this patent is extended or adjusted under 35 U.S.C. 154(b) by 407 days.

(21) Appl. No.: 12/230,454

(22) Filed: Aug. 28, 2008

(65) Prior Publication Data

US 2009/0063020 A1    Mar. 5, 2009

(30) Foreign Application Priority Data

Aug. 31, 2007    (JP)    ............... 2007-226462

(51) Int. Cl.
  *F02M 51/00*    (2006.01)
  *B60T 7/12*    (2006.01)
(52) U.S. Cl. .................. 123/478; 701/103; 701/104
(58) Field of Classification Search ............ 123/478, 123/480, 488, 490; 701/103, 104, 106
See application file for complete search history.

(56) References Cited

U.S. PATENT DOCUMENTS

| | | | |
|---|---|---|---|
| 5,483,945 A * | 1/1996 | Kobayashi et al. | 123/374 |
| 6,755,176 B2 * | 6/2004 | Takeuchi et al. | 123/299 |
| 6,988,030 B2 | 1/2006 | Asano et al. | |
| 6,990,950 B2 | 1/2006 | Asano et al. | |
| 7,363,912 B2 * | 4/2008 | Asano et al. | 123/436 |
| 7,599,784 B2 * | 10/2009 | Ishizuka et al. | 701/104 |
| 2004/0267433 A1 * | 12/2004 | Asano et al. | 701/104 |

FOREIGN PATENT DOCUMENTS

| | | |
|---|---|---|
| JP | 2005-016486 | 1/2005 |
| JP | 2005-155360 | 6/2005 |

OTHER PUBLICATIONS

Japanese Office Action dated Jun. 30, 2009, issued in corresponding Japanese Application No. 2007-226462, with English translation.

* cited by examiner

*Primary Examiner*—Thomas N Moulis
(74) *Attorney, Agent, or Firm*—Nixon & Vanderhye PC

(57) ABSTRACT

A fuel injection system designed to determine a correction value for correcting the quantity of fuel sprayed from a fuel injector into an internal combustion engine. The fuel injection system instructs the fuel injector to inject the fuel into the engine a plurality of times cyclically to learn an injection characteristic unique to the fuel injector and changes an injection duration for which the fuel is to be sprayed in each of injection events to disperse the injection durations evenly around a target injection quantity, thereby enabling the correction value to be determined in a decreased number of injections of fuel for a decreased amount of time.

15 Claims, 5 Drawing Sheets

FUEL INJECTION SYSTEM WITH INJECTION CHARACTERISTIC LEARNING FUNCTION

CROSS REFERENCE TO RELATED DOCUMENT

The present application claims the benefit of Japanese Patent Application No. 2007-226462 filed on Aug. 31, 2007, the disclosure of which is incorporated herein by reference.

BACKGROUND OF THE INVENTION

1. Technical Field of the Invention

The present invention relates generally to a fuel injection system which may be employed with automotive internal combustion engines to learn a deviation of the quantity of fuel actually sprayed by a fuel injector from a target quantity to produce a correction value for correcting an injection duration for which the fuel injector is to be opened to spray the fuel desirably.

2. Background Art

There are known fuel injection systems for diesel engines which are designed to spray a small quantity of fuel into the engine (usually called a pilot injection) prior to a main injection of fuel in order to reduce combustion noise or NOx emissions. However, a deviation of the quantity of fuel actually sprayed from a fuel injector from a target quantity in the pilot injection will result in a decrease in beneficial effects of the pilot injection.

In order to avoid the above problem, Japanese Patent First Publication No. 2005-155360 proposes a learning control system which is activated when the diesel engine is decelerating, and no fuel is being sprayed into the diesel engine. Specifically, the learning control system instructs a fuel injector to spray a single jet of a target quantity of fuel into the diesel engine, samples a resulting change in speed of the engine to calculate the quantity of fuel actually sprayed from the fuel injector, and determines a correction value for an injection duration for which the fuel injector is to spray the fuel (i.e., an on-duration for which the fuel injector is opened) based on a difference between the target quantity and the actually sprayed quantity of the fuel (which will also be referred to as an actual injection quantity below).

The learning control system works to use the correction value to regulate the injection duration so as to bring the actual injection quantity into agreement with the target quantity. The learning control system is designed to determine the injection duration in the learning mode directly as a function of the target quantity, thus giving rise to the problem that the correction value may have an error due to an injection characteristic (i.e., a relation between the injection duration and the actual injection quantity) unique to the fuel injector.

For example, the injection characteristic representing the relation between the on-duration Tq (i.e., the injection duration) for which the fuel injector is to be energized to spray the fuel) and the quantity of fuel sprayed from the fuel injector (i.e., the actual injection quantity) is, as demonstrated in FIG. 5, usually different between fuel injectors A, B, and C. The injection characteristics of the fuel injectors B and C are different in inclination thereof greatly from a basic injection characteristic which is designer-predefined.

The learning control system works to energize the fuel injectors for a constant basic on-duration Tqo, as selected from the basic injection characteristic, to spray the single jet of fuel and calculate a deviation of a resulting quantity of fuel actually sprayed from the fuel injector and the target quantity, and determine the correction value for the basic on-duration Tqo using such a deviation and the inclination of the basic injection characteristic.

Consequently, in the case where the fuel injector A whose injection characteristic is identical in the inclination with the basic injection characteristic is required to be learned, the correction value is calculated correctly to bring the actual injection quantity into agreement with the target quantity, while in the case where the injector B or C whose injection characteristic is greatly different in the inclination with the basic injection characteristic is required to be learned, it will result in a decrease in accuracy in determining the correction value, which leads to an error in bringing the actual injection quantity into agreement with the target quantity.

The above problem may be alleviated by instructing the fuel injector to spray the single jet of fuel several times cyclically for different injection durations, sampling combinations of the actual injection quantities and the injection durations to calculate the injection characteristic (i.e., the Q-Tq characteristic demonstrated in FIG. 5), and determining the correction value to correct the injection duration for which the fuel injector is to be opened to spray the target quantity based on the calculated injection characteristic.

The determination of the correction value with increased accuracy in the above manner requires even dispersion of the injection durations (i.e., the actual injection quantities) around the target quantity in a sequence of the injections of fuel into the engine through the fuel injector.

SUMMARY OF THE INVENTION

It is therefore a principal object of the invention to avoid the disadvantages of the prior art.

It is another object of the invention to provide a fuel injection system designed to calculate a correction value, which is required to correct an injection duration (i.e., an on-duration) for which a fuel injector is kept opened to inject fuel into an internal combustion engine so as to bring the quantity of fuel actually sprayed from the fuel injector into agreement with a target quantity, in accordance with an injection characteristic unique to the fuel injector.

According to one aspect of the invention, there is provided a fuel injection system for an internal combustion engine which may be employed with an automotive common rail fuel injection system. The fuel injection system comprises: (a) a fuel injector working to spray fuel into an internal combustion engine; and (b) an injection controller working to perform an injection instruction function when a given learning condition is encountered. The injection instruction function is to instruct the fuel injector to inject the fuel into the internal combustion engine a plurality of times for a given injection duration to learn an injection characteristic representing a relation between an injection duration for which the fuel injector sprays the fuel and a quantity of the fuel actually sprayed from the fuel injector for the injection duration. The injection controller also performs an injection duration changing function, an actual injection quantity determining function, and a correction value determining function. The injection duration changing function is to change the injection duration around a target injection quantity that is a target quantity of the fuel to be sprayed from the fuel injector in each of learning injection events in which the fuel injector is instructed by the injection instruction function to spray the fuel. The actual injection quantity determining function is to monitor a change in operating condition of the internal combustion engine to determine an actual injection quantity that is a quantity of the fuel expected to have been sprayed from the fuel injector in each of the learning injection events. The correction value determining function is to determine the injection characteristic of the fuel injector based on combinations of the actual injection quantities, as determined by the actual injection quantity determining function, and the injection durations for which the fuel injector has sprayed the fuel in the respective learning injection events to calculate an injection duration correction value based on the injection characteristic which is required to correct the injection duration for which the fuel injector is to be instructed to spray the fuel so as to bring a quantity of the fuel to be sprayed from the fuel injector into agreement with the target injection quantity.

When an integral average of the actual injection quantities, as determined by the actual injection quantity determining function, is smaller than the target injection quantity, the injection duration changing function defines the greatest of the injection durations, as ever used in the learning injection events, as a reference injection duration and produces the injection duration, which is greater than the reference injection duration, for use in a subsequent one of the learning injection events. Alternatively, when the integral average of the actual injection quantities is greater than the target injection quantity, the injection duration changing function defines the smallest of the injection durations, as ever used in the learning injection events, as the reference injection duration and produces the injection duration, which is smaller than the reference injection duration, for use in the subsequent one of the learning injection events.

Specifically, the injection controller works to learn the injection characteristic (i.e., the Q-Tq characteristic, as illustrated in FIG. 5) unique to the fuel injector correctly, thus enabling the quantity of fuel sprayed actually from the fuel injector to be brought into agreement with the target quantity accurately.

When the integral average of the actual injection quantities is greater or smaller than the target injection quantity, the injection duration changing function defines the smallest or the greatest of the injection durations, as ever used in the learning injection events, as the reference injection duration and produces the injection duration, which is smaller or greater than the reference injection duration, for use in the subsequent one of the learning injection events. This causes the injection durations in the learning injection events to be dispersed evenly above or blow the target quantity, which enables the correction value to be determined in a decreased number of injections of fuel into the engine for a decreased amount of time.

In the preferred mode of the invention, the injection instruction function works to select a basic injection duration, as determined based on a basic injection characteristic predefined for the fuel injector to spray the target injection quantity, as an initial value of the injection duration for which the fuel injector is to spray the fuel in a first one of the learning injection events.

The injection instruction function may alternatively work to select a lower guard value of the injection duration, as determined based on the basic injection characteristic predefined for the fuel injector to spray the target injection quantity, as the initial value of the injection duration for which the fuel injector is to spray the fuel in the first one of the learning injection events.

When the actual injection quantity, as determined by the actual injection quantity determining function, has continued to be one of greater and smaller than the target injection quantity a given number of times in the learning injection events, the injection duration changing function increases an amount by which the injection duration for use in the subsequent one of the learning injection events is changed.

The injection duration changing function may increase the amount by which the injection duration for use in the subsequent one of the learning injection events is changed with an increase in number of times the actual injection quantity, as determined by the actual injection quantity determining function, has continued to be one of greater and smaller than the target injection quantity.

When an absolute value of the actual injection quantity corresponding to the reference injection duration has exceeded a first range, the injection duration changing function changes the injection duration in a direction opposite a direction in which the injection duration has been changed last so as to bring the actual injection quantity in the subsequent one of the learning injection events close to the target injection quantity and defines the changed injection duration for use in the subsequent one of the learning injection events. This prevents a range in which the actual injection quantity and the injection duration are to be sampled from exceeding the first range greatly, thus ensuring the accuracy in determining the injection characteristic of the fuel injector.

When the absolute value of the actual injection quantity corresponding to the reference injection duration has exceeded the first range, the injection duration changing function may alternatively search one of the injection durations, as ever used in the learning injection events, which is the closest to the reference injection duration and define the searched one as the injection duration for use in the subsequent one of the learning injection events.

When the absolute value of the actual injection quantity corresponding to the reference injection duration has exceeded a second range greater than the first range, the injection duration changing function changes the injection duration so as to bring the actual injection quantity in the subsequent one of the learning injection events toward the target injection quantity and defines the changed injection duration for use in the subsequent one of the learning injection events.

When the absolute value of the actual injection quantity corresponding to the reference injection duration has exceeded the second range, the injection duration changing function may correct the reference injection duration as a function of a ratio of a change in the actual injection quantity to the injection duration defined in a basic injection characteristic predefined for the fuel injector to spray the target injection quantity and defines the corrected reference injection duration as the injection duration for use in the subsequent one of the learning injection events.

When the absolute value of the actual injection quantity corresponding to the reference injection duration has exceeded the second range, the injection controller may exclude the actual injection quantity from use in determining the injection characteristic of the fuel injector through the correction value determining function, thereby ensuring the accuracy in determining the correction value.

When the injection controller has excluded the actual injection quantity from use in determining the injection characteristic of the fuel injector through the correction value determining function, the injection controller may increase the number of times the injection instruction function instructs the fuel injector to spray the fuel to learn the injection characteristic in order to ensure the accuracy in determining the correction value.

When the number of times the absolute value of the actual injection quantity corresponding to the reference injection duration has exceeded the second range is greater than a given value, the injection controller may deactivate the injection instruction function to spray the fuel through the fuel injector. Specifically, in such an event, the injection controller determines that the fuel injection system is malfunctioning and stops spraying the fuel to learn the injection characteristic of the fuel injector.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
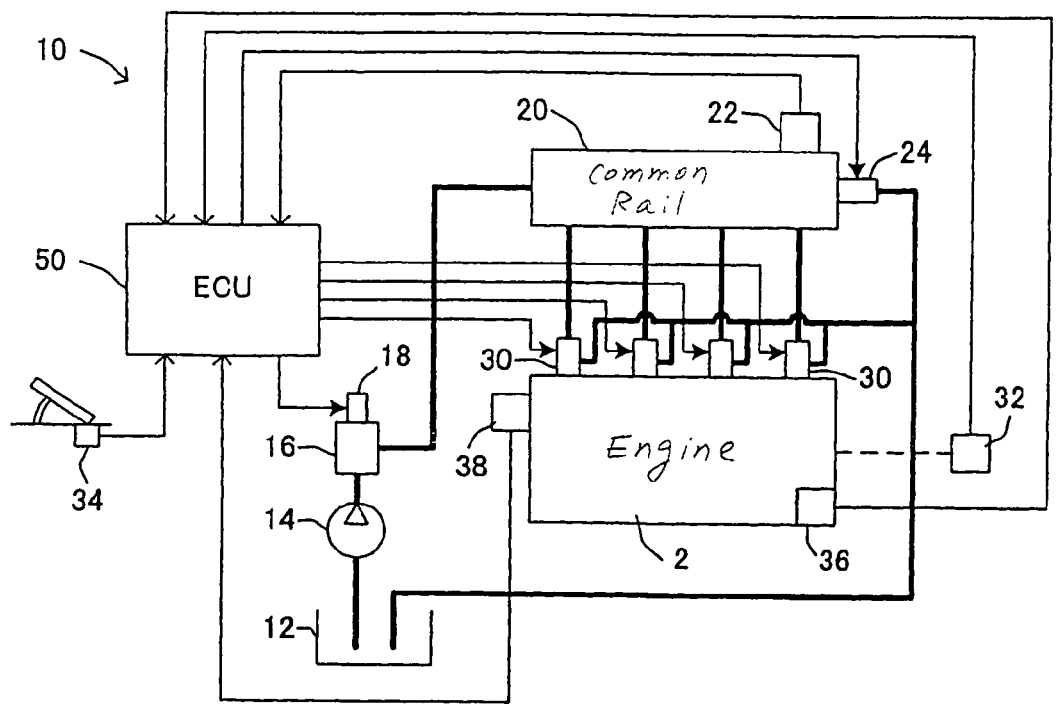
FIG. 1 is a block diagram which illustrates a fuel injection system according to the invention.

Referring to the drawings, particularly to FIG. 1, there is shown an accumulator fuel injection system 10 according to the invention.

The accumulator fuel injection system 10, as referred to herein, is designed to supply fuel to, for example, an automotive four-cylinder diesel engine 2 and essentially includes a common rail 20, fuel injectors 30, and an electronic control unit (ECU) 50. The common rail 20 works as an accumulator which stores therein the fuel at a controlled high pressure. The fuel injectors 30 are installed one in each of cylinders of the diesel engine 2 and work to spray the fuel, as supplied from the common rail 20, into combustion chambers of the diesel engine 2. The ECU 50 works to control a whole operation of the fuel injection system 10.

The fuel injection system 10 also includes a feed pump 14 and a high-pressure pump 16. The feed pump 14 works to pump the fuel out of a fuel tank 12 and feed it to the high-pressure pump 16. The high-pressure pump 16 works to pressurize and deliver the fuel to the common rail 20.

The high-pressure pump 16 is of a typical structure in which a plunger is reciprocated following rotation of a cam of a camshaft of the diesel engine 2 to pressurize the fuel sucked into a pressure chamber thereof. The high-pressure pump 16 is equipped with a suction control valve 18 which control the flow rate of fuel to be sucked from the feed pump 14 when the plunger is in a suction stroke.

The common rail 20 has installed therein a pressure sensor 22 which measures the pressure of fuel in the common rail 20 (which will also be referred to as a rail pressure below) and a pressure reducing valve 24 which drains the fuel from the common rail 20 to the fuel tank 12 to reduce the rail pressure.

The fuel injection system 10 also includes a speed sensor 32, an accelerator position sensor 34, a coolant temperature sensor 36, and an intake air temperature sensor 38. The speed sensor 32 works to measure the speed NE of the diesel engine 2. The accelerator position sensor 34 work to measure a driver's effort on or position ACC of an accelerator pedal (which corresponds to an open position of a throttle valve). The coolant temperature sensor 36 works to measure the temperature THW of coolant of the diesel engine 2. The intake air temperature sensor 38 works to measure the temperature TA of intake air charged into the diesel engine 2.

The ECU 50 is implemented by a typical microcomputer made up of a CPU, a ROM, and a RAM. The CPU works to implement a control program stored in the ROM to control the whole operation of the fuel injection system 10.

The ECU 50 samples outputs from the pressure sensor 22, the sensors 32, 34, 36, and 38 and controls the pressure in the common rail 20, the quantity of fuel to be sprayed form the fuel injectors 30 and injection timings of the fuel injectors 30.

Specifically, the ECU 50 works (a) to calculate a target pressure in the common rail 20 (i.e., a target pressure of fuel to be sprayed from the fuel injectors 30 which will also be referred to as a target injection pressure below) based on the operating conditions of the diesel engine 2 in a known manner and control energization of the suction control valve 18 and the pressure reducing valve 24 to bring the pressure in the common rail 20, as measured by the pressure sensor 22, into agreement with the target pressure in a feedback control mode (which will also be referred to as common rail pressure control below) and (b) to calculate a target quantity of fuel to be sprayed from the fuel injectors 30 based on the operating conditions of the diesel engine 2 and to open each of the fuel injectors 30 at a given injection timing for an injection duration, as selected as a function of the target quantity to spray the fuel into one of the cylinders of the diesel engine 2 in a regular fuel injection control mode (which will also be referred to as fuel injection control below).

The ECU 50 is also designed to perform the pilot injection, as described above, prior to the main injection in the regular fuel injection control mode. The accuracy of the pilot injection in each of the fuel injectors 30 usually varies depending upon a deviation of a pulse width of a drive signal to be outputted from the ECU 50 to each of the fuel injectors 30 (i.e., an on-duration Td or an injection duration for which each of the fuel injectors 30 is kept opened, in other words, a target quantity of fuel to be sprayed from each of the fuel injectors 30) from the quantity of fuel actually sprayed from the fuel injector 30 (will also be referred to as an actual injection quantity or injection quantity Q below). In order to compensate for such an injection quantity deviation, the ECU 50 enters an injection quantity learning mode to learn the actual injection quantity to determine the target-to-actual injection quantity deviation and calculate a correction value (also referred to as an injection duration correction value below) required to correct the drive signal (i.e., the on-duration Td) to be outputted to a corresponding one of the fuel injectors 30 so as to bring the actual injection quantity Q into agreement with the target quantity (i.e., a pilot injection quantity). In the regular fuel injection mode, the ECU 50 uses the corrected drive signal to control the injection duration of a corresponding one of the fuel injectors 30 to bring the actual injection quantity Q into agreement with the target quantity in the pilot injection mode.

Figure 2A:
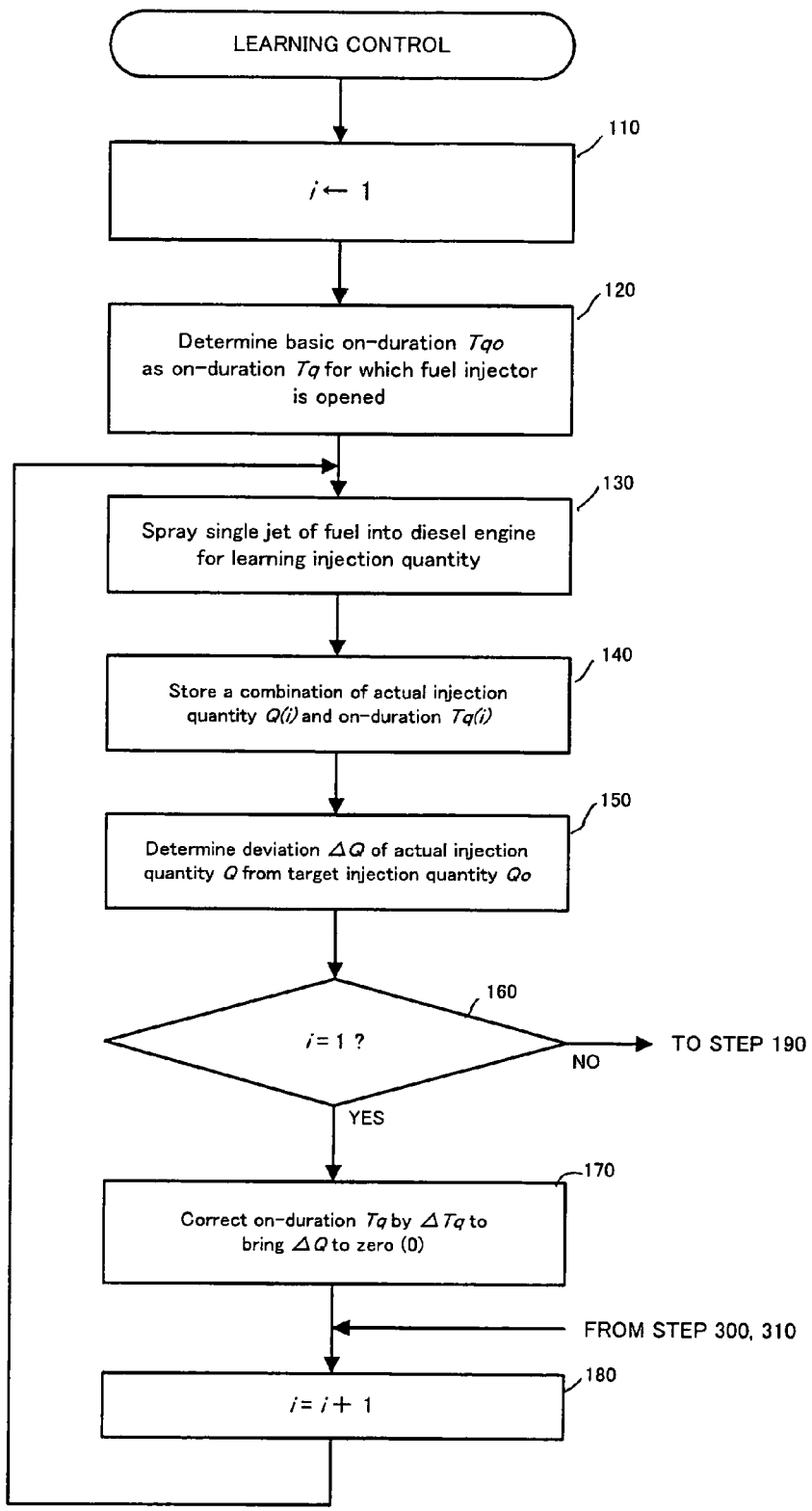
FIGS. 2(a), 2(b), and 2(c) illustrate a flowchart of a learning control program to be executed by an electronic control unit of the fuel injection system of FIG. 1.
Figure 2B:
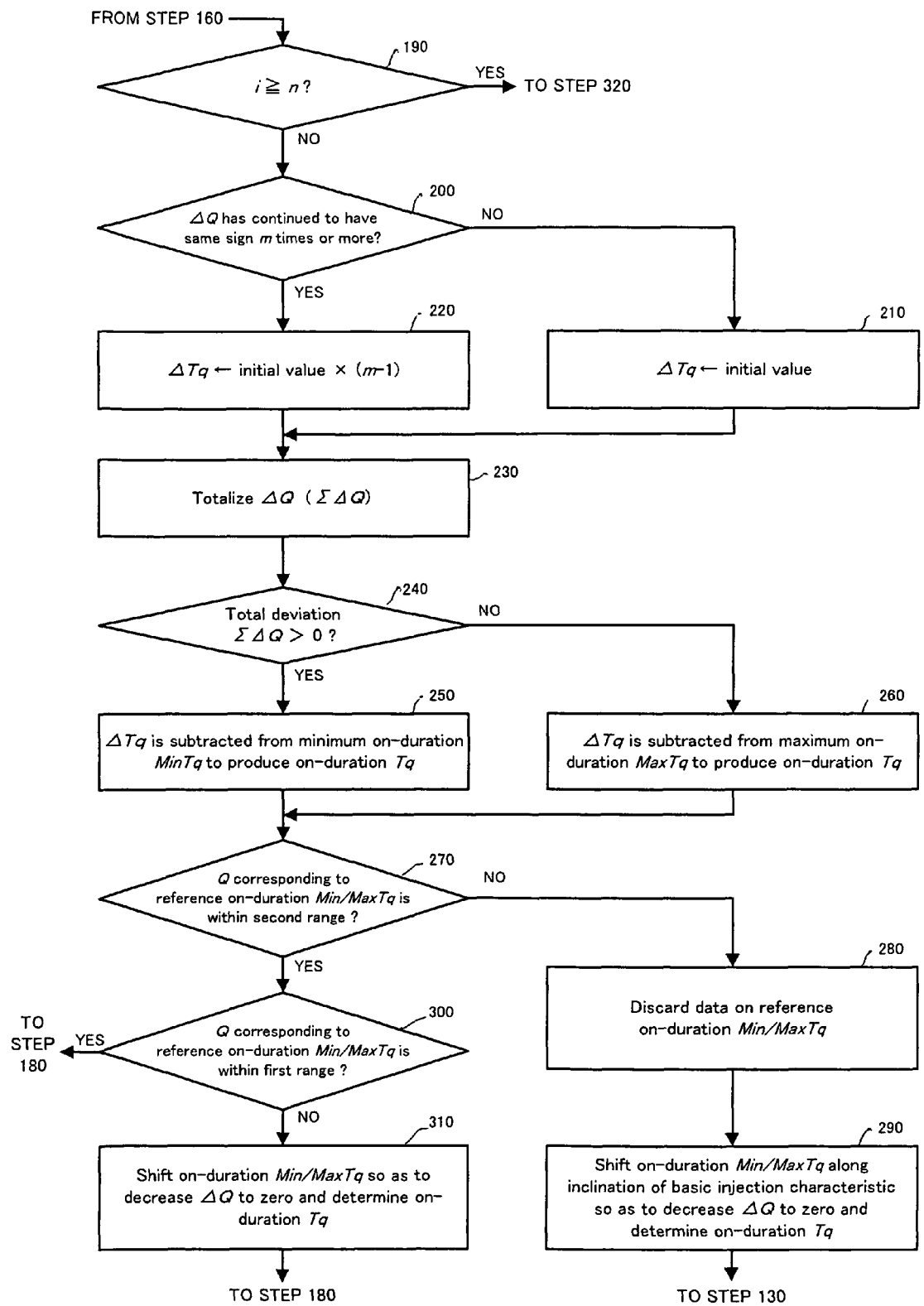
Figure 2C:
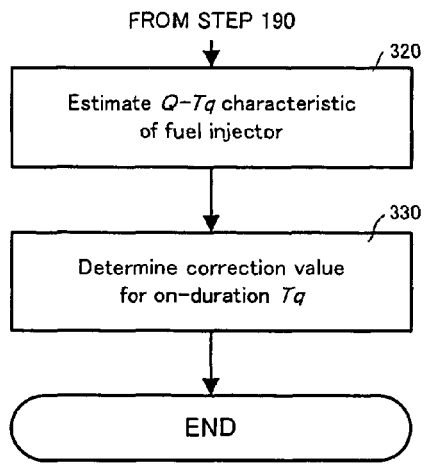

FIGS. 2(a) to 2(c) show a flowchart of an injection quantity learning program to be executed by the ECU 50 in the injection quantity learning mode. This program is executed for each of the cylinders (i.e., the fuel injectors 30) of the diesel engine 2 when a learning condition in which the position ACC of the accelerator pedal is zero (0), in other words, the accelerator pedal is released fully, to decelerate the diesel engine 2, and no fuel is being sprayed into each of the cylinders of the diesel engine 2 is encountered.

After entering the program, the routine proceeds to step 110 wherein a count value i indicating the number of learnings, i.e., the number of times the actual injection quantity Q has been learned in one of the cylinders of the diesel engine 2 for which the program is being executed is reset to an initial value of one (1). The routine proceeds to step 120 wherein a basic on-duration Tqo for which a target quantity Qo of fuel is to be sprayed from a corresponding one of the fuel injectors 30 in the injection quantity learning mode is determined as the on-duration Tq for which the fuel injector 30 is to be energized so that it is opened.

Figure 5:
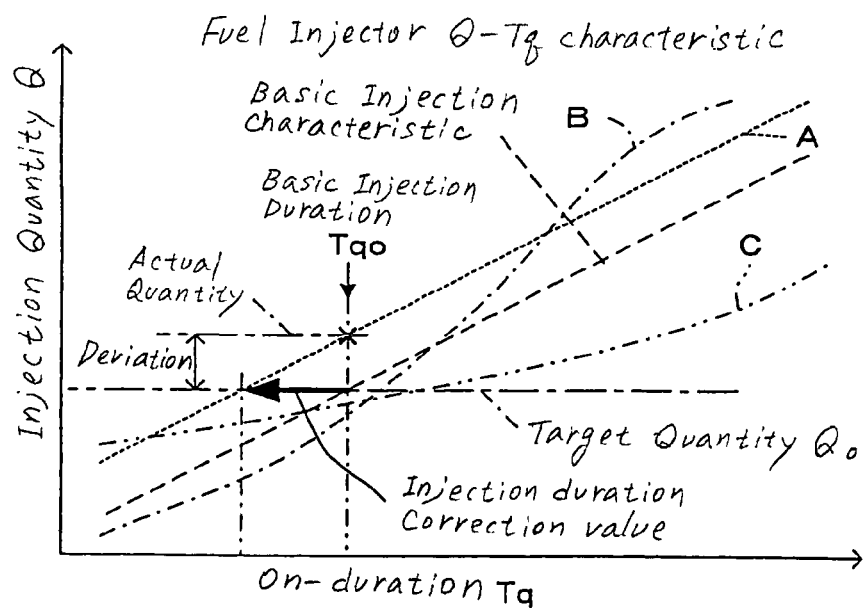
FIG. 5 is an explanatory view which demonstrate deviations of the quantity of fuel actually sprayed from fuel injectors from a target quantity due to a difference in injection characteristic between the fuel injectors.

Specifically, the basic on-duration Tqo is, as demonstrated in FIG. 5, predetermined in a basic injection characteristic of the fuel injectors 30 as the length of time required to open the fuel injectors 30 to bring the injection quantity Q (i.e., the quantity of fuel actually sprayed form the fuel injector 30) into agreement with the target quantity Qo.

The routine proceeds to step 130 wherein the drive signal is outputted to a corresponding one of the fuel injectors 30 to turn on or open it at a given injection timing for the on-duration Tq, as determined in step 120 or a following step which will be described later in detail, to spray a single jet of the fuel into the diesel engine 2.

After the fuel is sprayed from the one of the fuel injectors 30 in step 130, the routine proceeds to step 140 wherein an output from the speed sensor 32 is sampled to derive an operating condition and a change thereof (i.e., the speed NE of the diesel engine 2 and a change thereof) of the diesel engine 2. Specifically, the ECU 50 monitors the speed NE of the diesel engine 2 and a change thereof to calculate an output torque of the diesel engine 2 and determines the actual injection quantity Q as a function of the output torque in a known manner. The ECU 50 also stores a combination of the on-duration Tq, as derived in step 120, and the actual injection quantity Q in an injection quantity-to-on-duration table prepared in the RAM.

The routine proceeds to step 150 wherein a deviation ΔQ of the actual injection quantity Q, as determined in step 140, from the target quantity Qo is calculated.

The routine proceeds to step 160 wherein it is determined whether the count value i is the initial value of one (1) or not, in other words, whether the learning of the injection quantity Q has been completed for the first time or not. If a YES answer is obtained, then the routine proceeds to step 170 wherein the on-duration Tq is corrected or changed by a given on-time amount ΔTq to decrease the deviation ΔQ to zero (0).

The routine proceeds to step 180 wherein the count value i is incremented by one (1). The routine then returns back to step 130 to instruct the corresponding one of the fuel injectors 30 to spray the fuel for the corrected on-duration Td.

Figure 3A:
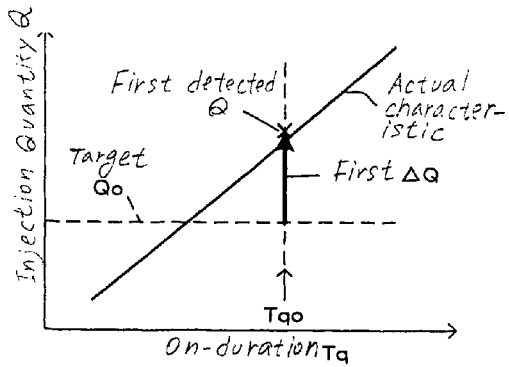
FIGS. 3(a) to 3(h) are views which demonstrate how to change an on-duration (i.e., an injection duration) for which a fuel injector is kept to spray fuel in a learning control mode executed in the program of FIGS. 2(a) to 2(c)
Figure 3B:
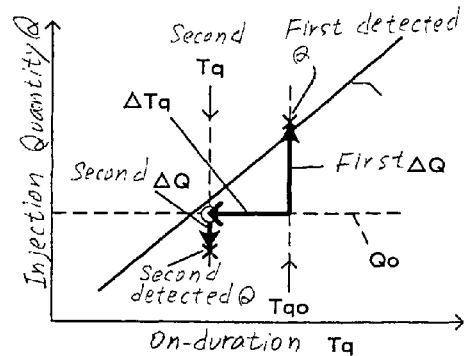

Specifically, when the actual injection quantity Q is sampled which has been produced by the first event of the injection of fuel into the diesel engine 2, the ECU 50 determines, as illustrated in FIG. 3(a), the deviation ΔQ of the actual injection quantity Q from the target quantity Qo and alters, as illustrated in FIG. 3(b), the on-duration Tq by the given on-time amount ΔTq to decrease the deviation ΔQ to zero (0). The ECU 50 then performs the second injection of the fuel for the corrected on-duration Tq.

If a NO answer is obtained in step 160 meaning that the count value i is not the initial value, then the routine proceeds to step 190 wherein it is determined whether the count value i has reached a given number n of learnings or not. If a NO answer is obtained, then the routine proceeds to step 200 wherein it is determined whether the deviation ΔQ of the actual injection quantity Q from the target quantity Qo, as calculated in step 150 each time the fuel is sprayed into the diesel engine 2, has continued to have the same sign (i.e., a positive or negative sign) m times or more (e.g., three times or more). If a NO answer is obtained meaning that the actual-to-target quantity deviation ΔQ has not continued to have the same sign m times, then the routine proceeds to step 210 wherein the on-time amount ΔTq by which the on-duration Tq is to be changed is set to an initial value for use in step 170. The routine then proceeds to step 230.

Figure 3C:
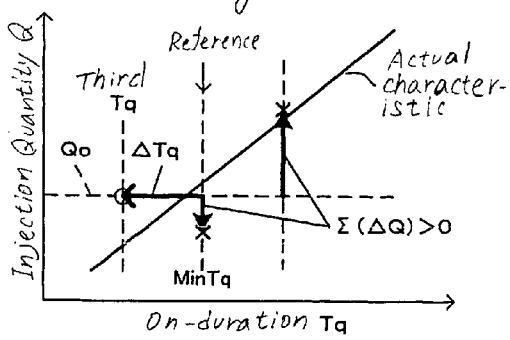
Figure 3D:
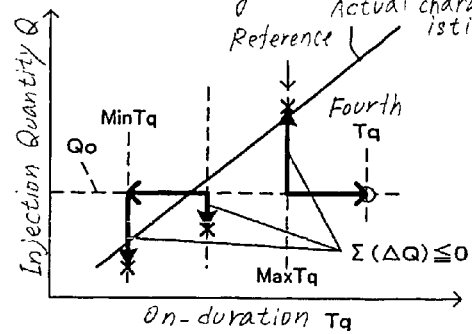
Figure 3E:
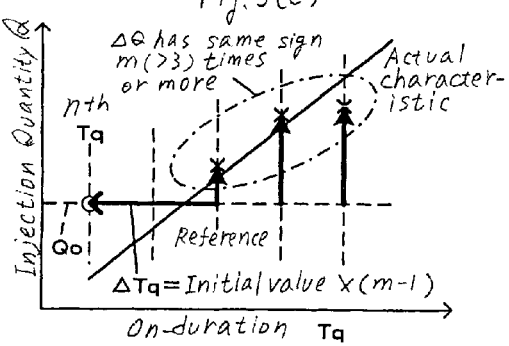

Alternatively, if a YES answer is obtained in step 200 meaning that the actual-to-target quantity deviation ΔQ has continued to have the same sign m times, then the routine proceeds to step 220 wherein the on-time amount ΔTq is, as demonstrated in FIG. 3(e), set to a value derived by multiplying the initial value by a given number (e.g., m−1).

The routine proceeds to step 230 wherein the actual-to-target quantity deviations ΔQ, as derived in this and previous executions of step 150, are summed as a total deviation Σ (ΔQ). The routine proceeds to step 240 wherein it is determined whether the total deviation Σ (ΔQ) is greater than zero (0) or not.

If a YES answer is obtained meaning that the total deviation Σ (ΔQ) is greater than zero (0), then the routine proceeds to step 250 wherein the smallest of the on-durations Tq, as ever used in step 130 to spray the fuel into the diesel engine 2, is determined as a reference on-duration MinTq, and the on-time amount ΔTq derived in step 210 or 220 is, as demonstrated in FIG. 3(c), subtracted from the reference on-duration MinTq to produce the on-duration Tq(=MinTq−ΔTq) for use in a subsequent injection of the fuel. Alternatively, if a NO answer is obtained in step 240 meaning the that the total deviation Σ (ΔQ) is smaller than or equal to zero (0), then the routine proceeds to step 260 wherein the greatest of the on-durations Tq, as ever used in step 130 to spray the fuel into the diesel engine 2, is determined as a reference on-duration MaxTq, and the on-time amount ΔTq derived in step 210 or 220 is, as demonstrated in FIG. 3(d), added to the reference on-duration MaxTq to produce the on-duration Tq (=MaxTq+ΔTq) for use in a subsequent injection of the fuel.

After step 250 or 260, the routine proceeds to step 270 wherein either of the reference on-durations MinTq and MaxTq which is selected in this program cycle for use in the subsequent injection of the fuel is determined as a reference on-duration Min/MaxTq, and it is determined whether an absolute value of the actual injection quantity Q corresponding to the reference on-duration Min/MaxTq lies within a predetermined second range or not.

If a NO answer is obtained meaning that an absolute value of the actual injection quantity Q corresponding to the reference on-duration Min/MaxTq is out of the second range, then the routine proceeds to step 280 wherein data on the actual injection quantity Q corresponding to the reference on-duration Min/MaxTq, as derived in step 140, is discarded. The routine then proceeds to step 290 wherein the reference on-duration Min/MaxTq is corrected based on a ratio of a change in injection quantity Q to the on-duration of the fuel injectors 30 in a basic injection characteristic thereof to determine the on-duration Tq for use in a subsequent injection of the fuel so as to bring a resulting sprayed quantity of fuel into the target quantity Qo.

Figure 3F:
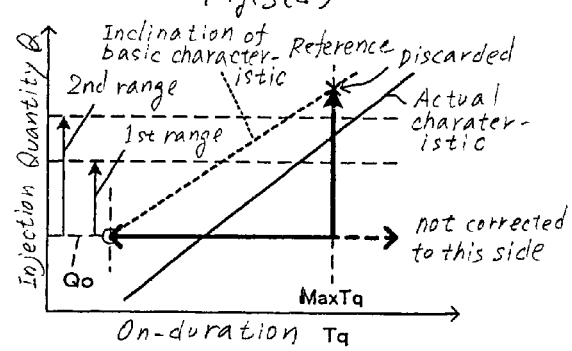

Specifically, in step 290, the on-duration Min/MaxTq is shifted, as illustrated in FIG. 3(f), along an inclination of the basic injection characteristic to the value at which the injection quantity Q is identical with the target injection quantity Qo and selected as the on-duration Tq for use in the subsequent injection of the fuel. FIG. 3(f) illustrates for the case where the reference on-duration MaxTq is determined as the reference on-duration Min/MaxTq.

After the on-duration Tq is determined in step 290, the routine returns back to step 130 without updating the count value i.

Alternatively, if a YES answer is obtained in step 270 meaning that the absolute value of the actual injection quantity Q corresponding to the reference on-duration Min/MaxTq is within the second range, then the routine proceeds to step 300 wherein it is determined whether the absolute value of the actual injection quantity Q corresponding to the reference on-duration Min/MaxTq lies within a predetermined first range smaller than the second range or not.

Figure 3G:
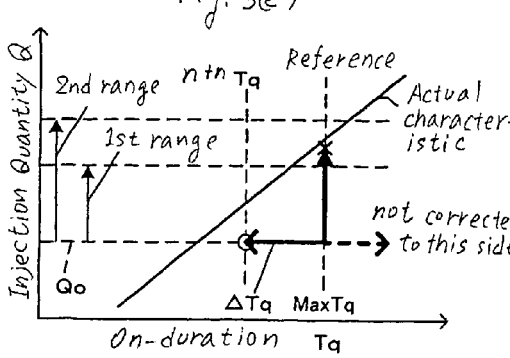

If a YES answer is obtained meaning that the absolute value of the actual injection quantity Q corresponding to the reference on-duration Min/MaxTq lies within the first range, then the routine proceeds directly to step 180. Alternatively, if a NO answer is obtained, then the routine proceeds to step 310 wherein the reference on-duration Min/MaxTq is shifted, as illustrated in FIG. 3(g), by the time among $\Delta Tq$ to bring the actual-to-target quantity deviation $\Delta Q$ close to zero (0) in a direction opposite a direction in which the reference on-duration Min/MaxTq is shifted in step 250 or 260, as illustrated in FIG. 3(c) or 3(d), and then re-determined as the on-duration Tq for use in the subsequent injection of the fuel in order to avoid a great deviation of the quantity of fuel to be sprayed from the fuel injector 30 from the target quantity Q. FIG. 3(g) illustrates for the case where the reference on-duration MaxTq is determined as the reference on-duration Min/MaxTq.

If a YES answer is obtained in step 190 meaning that the count value i has reached the number n of learnings, then the routine proceeds to step 320 wherein n combinations of the actual injection quantities Q and the corresponding on-durations Tq, as stored in the RAM of the ECU 50, are used to calculate an injection characteristic (i.e., Q-to-Tq relation) of the fuel injector 30. For instance, the least squares method is used, as demonstrated in FIG. 3(h), to linearly approximate the relation between the on-duration Tq and the actual injection quantity Q (i.e., Q=a ((Tq+b) as the injection characteristic of the fuel injector 30.

The routine then proceeds to step 320 wherein a correction value $\Delta Tqc$ is calculated which is required to correct the basic on-duration Tqo so as to bring the actual injection quantity Q (i.e., the quantity of fuel to be sprayed actually from the fuel injector 30) into agreement with the target injection quantity Qo in the injection characteristic, as derived in step 320. The routine then terminates.

As apparent from the above discussion, when the learning condition is encountered, the ECU 50 of the fuel injection system 10 enters the injection quantity learning mode and works to spray the fuel from a selected one of the fuel injectors 30 and calculate the quantity of fuel actually sprayed from the one of the fuel injectors 30 (i.e., the actual injection quantity Q) based on a resulting change in operating condition of the diesel engine 2 to alter the on-duration Td for use in a subsequent injection of the fuel in a cycle in the injection quantity learning mode.

The ECU 50 uses the results of the cyclic learnings, i.e., the n combinations of the actual injection quantities Q and the on-durations Tq to determine the injection characteristic (i.e., the Q-to-Td relation) of the selected one of the fuel injectors 30 and calculates the correction value $\Delta Tqc$ which is required to correct the basic on-duration Tqo so as to bring the actual injection quantity Q into agreement with the target quantity Qo in the determined injection characteristic.

Specifically, the ECU 50 functions to derive the correction value $\Delta Tqc$ suitable for the injection characteristic of each of the fuel injectors 30 for use in bringing the actual injection quantity Q into agreement with the target quantity Qo, especially in the pilot injection in the regular fuel injection control mode.

In the injection quantity learning mode, the ECU 50 sprays the fuel for the basic on-duration Tqo in the first injection event, as illustrated in FIG. 3(a), and then sprays the fuel in the second and following injection events for the on-durations Td selected, as illustrated in FIGS. 3(b) to 3(d). Specifically, the on-duration Tq for use in the second injection event is determined by shifting that used in the first injection event by the on-time amount $\Delta Tq$ so as to bring the actual injection quantity Q, as calculated as the quantity of fuel having been sprayed in the first injection event, into agreement with the target quantity Qo. The on-duration Tq for use in the third or following injection events is determined in the manner, as described below.

1) When the total deviation $\Sigma\ (\Delta Q)$ that is the sum of the actual-to-target quantity deviations $\Delta Q$, as derived in the previous injection events, is greater than zero (0), that is, when an integral average (also called an integration mean value) of the actual injection quantities Q, as calculated in the previous injection events, is greater than the target quantity Qo, the smallest of the on-durations Tq, as already used in the previous injection events, is determined as the reference on-duration MinTq. The on-time amount $\Delta Tq$ is subtracted from the reference on-duration MinTq to produce the on-duration Tq(=MinTq−$\Delta Tq$) for use in a subsequent injection event.

2) Alternatively, when the total deviation $\Sigma\ (\Delta Q)$ is less than or equal to zero (0), that is, when the integral average of the actual injection quantities Q, as calculated in the previous injection events, is smaller than or equal to the target quantity Qo, the greatest of the on-durations Tq, as already used in the previous injection events, is determined as the reference on-duration MaxTq. The on-time amount $\Delta Tq$ is added to the reference on-duration MaxTq to produce the on-duration Tq (=MaxTq+A Tq) for use in a subsequent injection event.

Figure 3H:
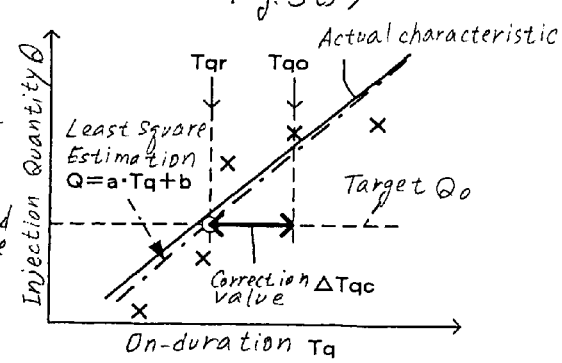
Figure 1:
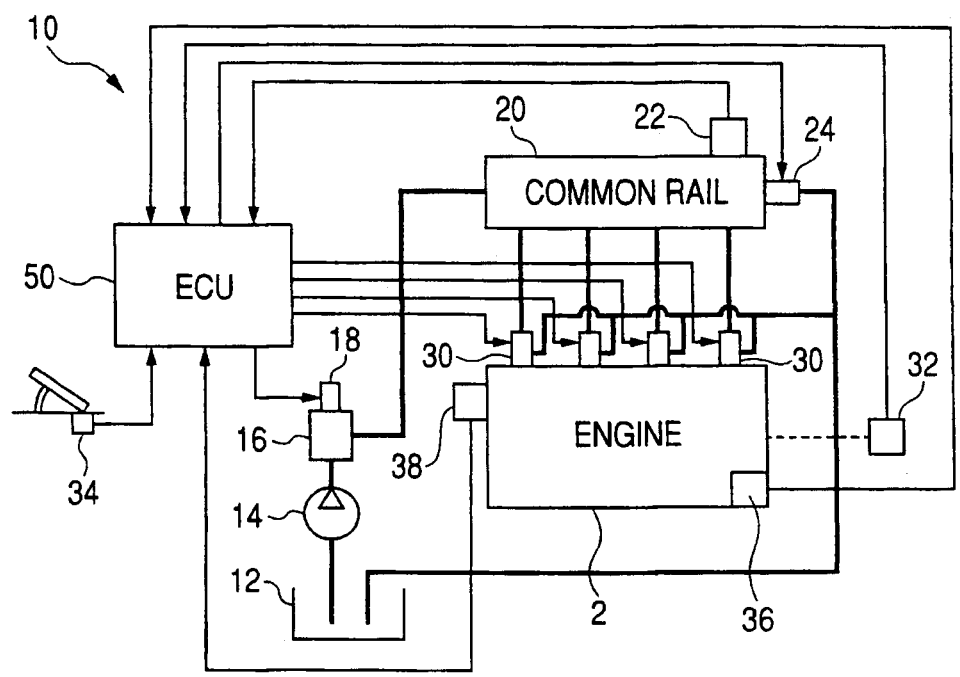
Figure 2A:
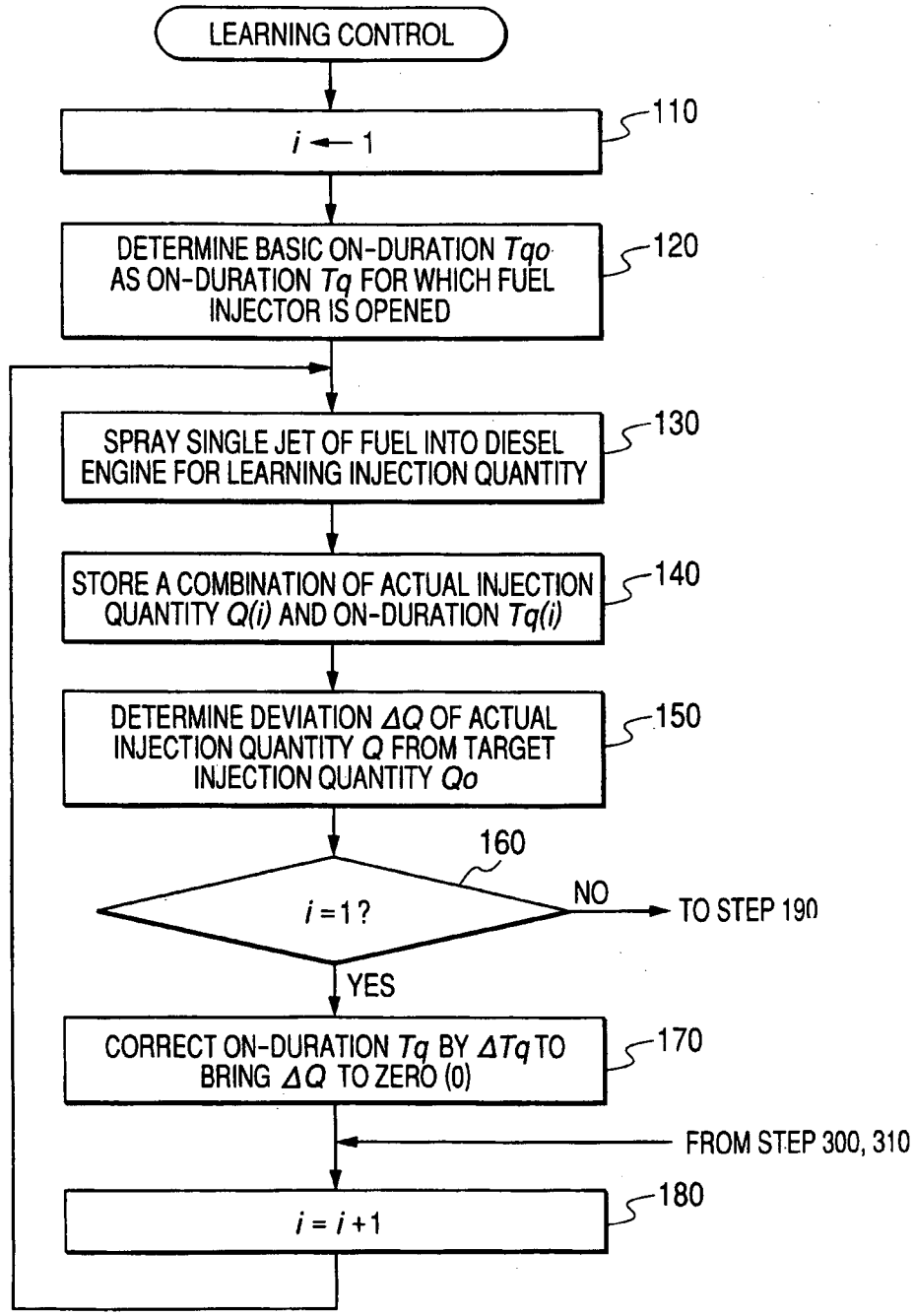
Figure 2C:
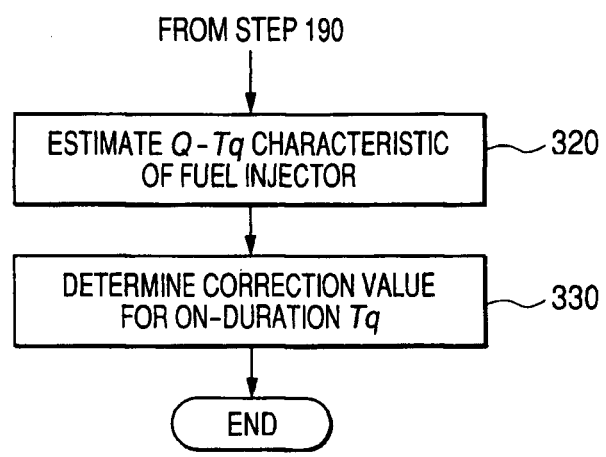
Figure 3A:
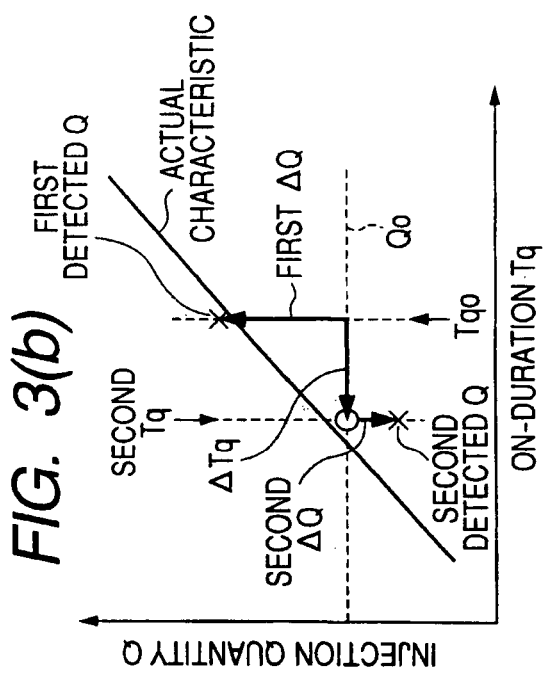
Figure 3B:
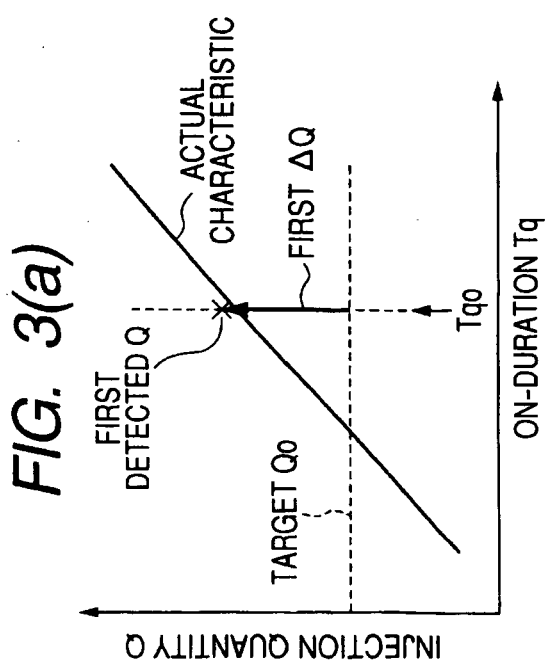
Figure 3C:
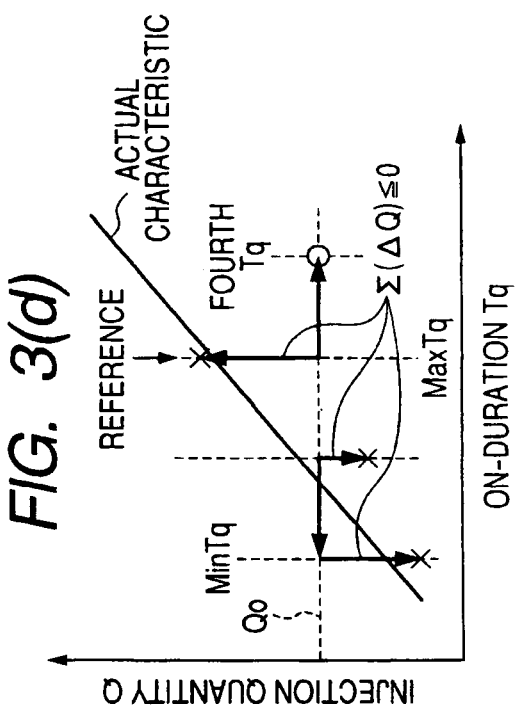
Figure 3D:
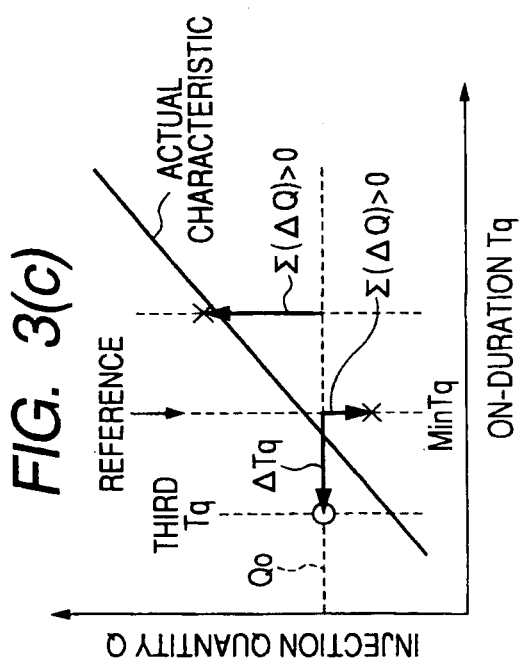
Figure 3F:
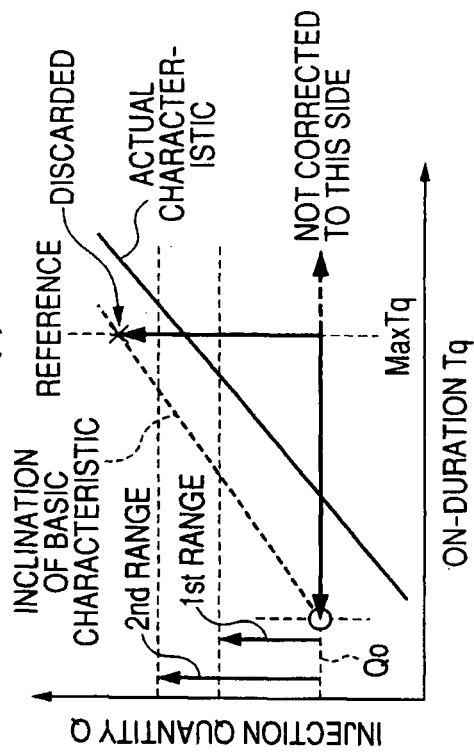
Figure 3H:
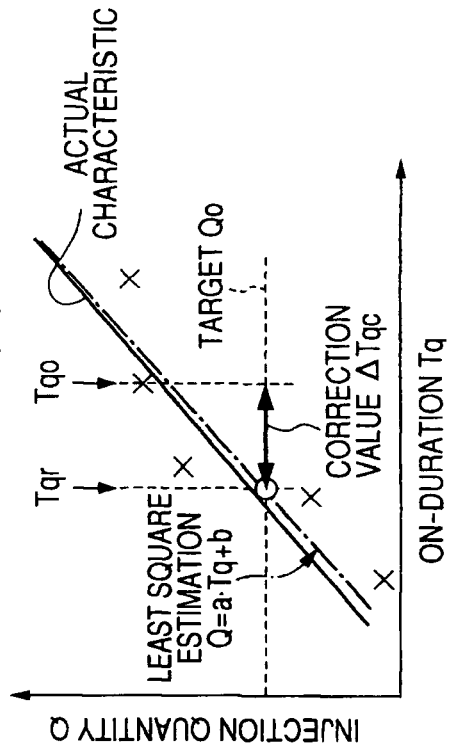
Figure 3E:
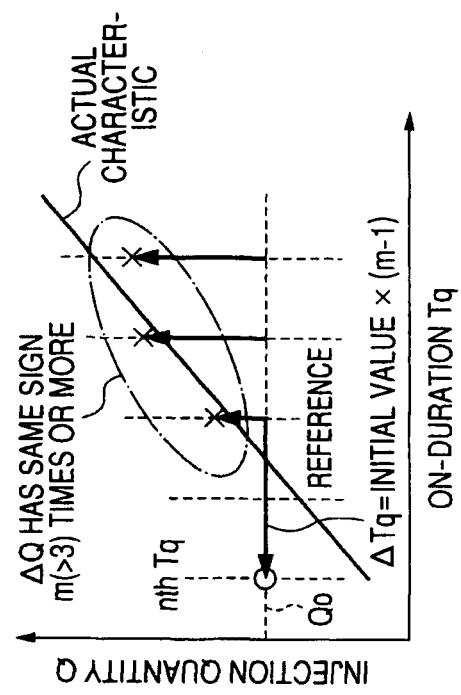
Figure 3G:
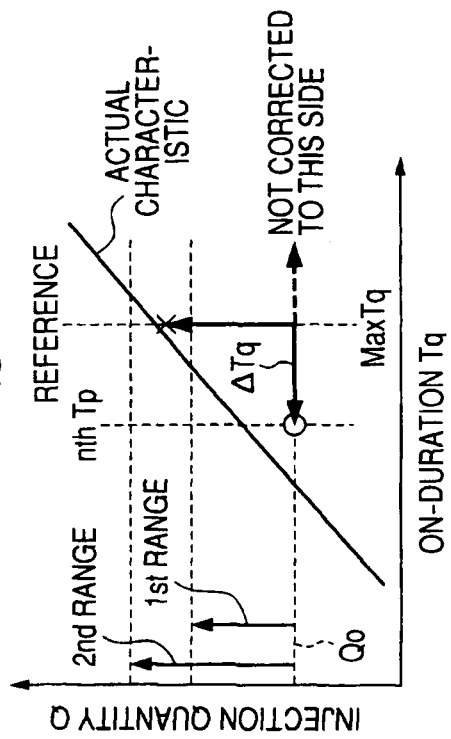
Figure 4:
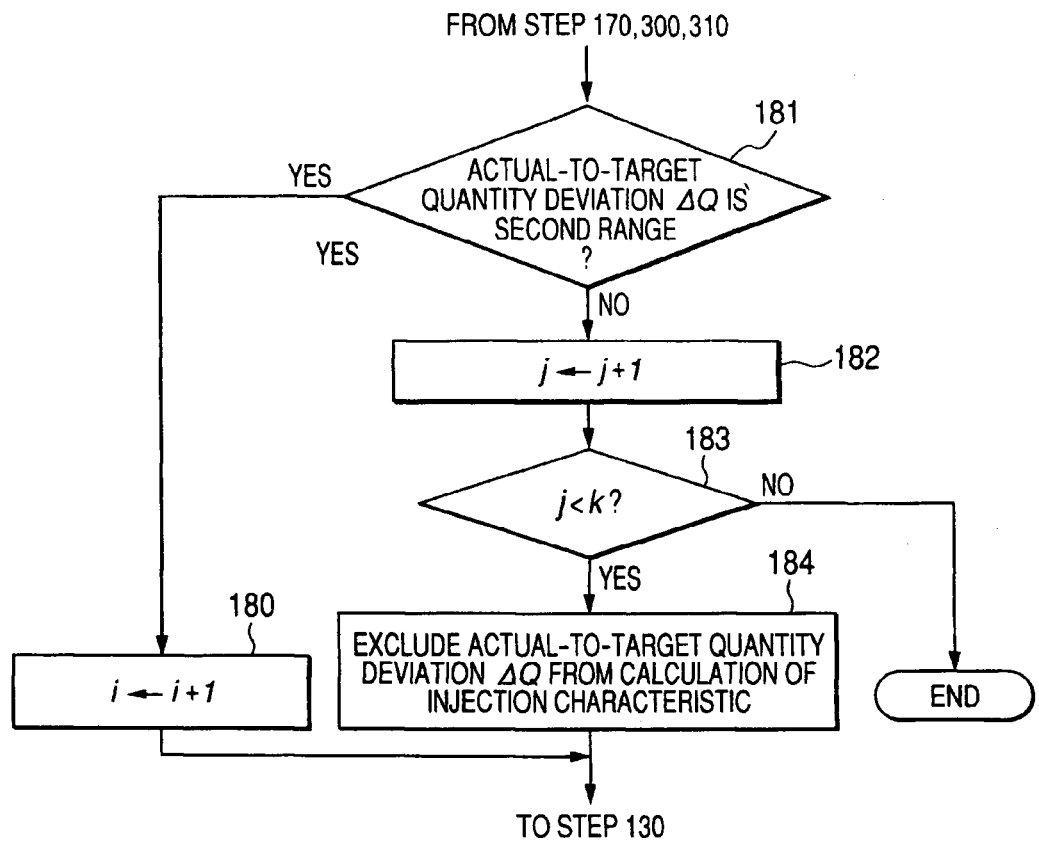
Figure 5:
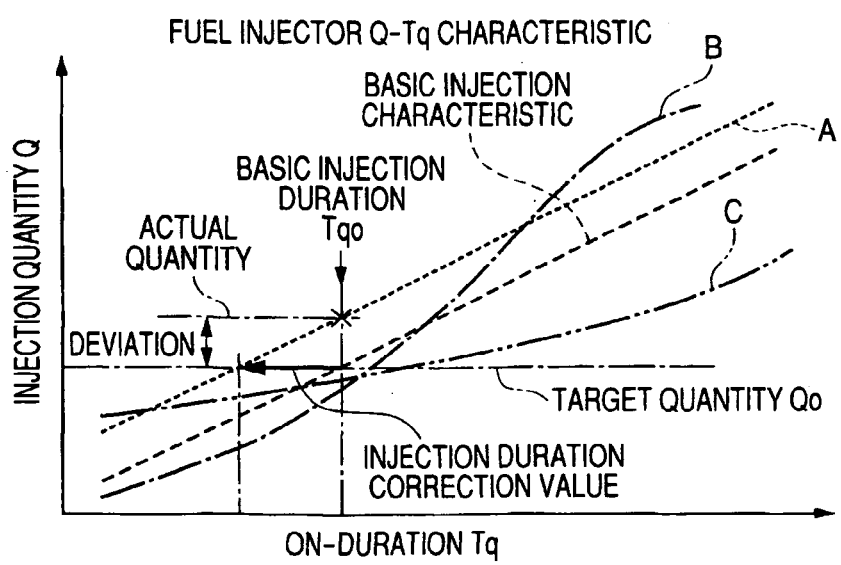

As can be seen from FIG. 3(h), the quantities of fuel actually sprayed in the cyclic injection events in the injection quantity learning mode are dispersed evenly across the target quantity Qo in directions which increases and decreases the actually sprayed quantities, respectively. Specifically, the ECU 50 is designed to change the actually sprayed quantities of fuel (i.e., the actual injection quantities Q) in sequence around the target quantity Qo to calculate the injection characteristic (i.e., the Q-to-Tq relation) of each of the fuel injectors 30 in a decreased number of injections of fuel into the diesel engine 2. This enables the correction $\Delta Tqc$ required to correct the basic on-duration Tqo to be determined for a decreased amount of time.

Further, when the actual-to-target quantity deviation $\Delta Q$ has continued to have the same sign a given number of times (i.e., m times), in other words, when the actual injection quantity Q is sequentially smaller or greater than the target quantity Qo the given number of times, as illustrated in FIG. 3(e), the on-time amount $\Delta Tq$ which is to be used to determine the on-duration Tq in a subsequent injection event is increased from the initial value.

Therefore, for example, when the inclination of the injection characteristic is too small to reverse the correlation in value between the actual injection quantity Q and the target quantity Qo through a plurality of injection events, the ECU 50 works to increase the on-time amount ΔTq used to correct the on-duration Tq to reverse the correlation in value between the actual injection quantity Q and the target quantity Qo quickly, thereby changing the actual injection quantity Q around the target quantity Qo within a decreased amount of time. An increment of the on-time amount ΔTq may be fixed at a constant value (e.g., (m−−1)), but alternatively be changed as a function of the number of times the actual-to-target quantity deviation ΔQ has showed the same sign sequentially.

When the absolute value of the actual injection quantity Q corresponding to the reference on-duration Min/MaxTq that is either of the smallest or the greatest of the on-durations Tq, as already used to spray the fuel into the diesel engine 2 in the injection quantity learning mode, is out of the first range, as defined around the target quantity Qo, the ECU 50 shifts the reference on-duration Min/MaxTq in a direction opposite a direction in which the reference on-duration Min/MaxTq has ever been shifted and re-determines it as the on-duration Tq for use in the subsequent injection of the fuel in order to a great deviation of the quantity of fuel expected to be sprayed from the fuel injector 30 from the target quantity Q to ensure the accuracy in calculating the injection characteristic of the fuel injector 30 near the target quantity Qo.

When the absolute value of the actual injection quantity Q corresponding to the reference on-duration Min/MaxTq is out of the second range defined around the target quantity Qo, the ECU 50 discards the data on the actual injection quantity Q corresponding to the reference on-duration Min/MaxTq and determines the on-duration Tq required to bring the injection quantity Q toward the target quantity Qo, as illustrated in FIG. 3(*f*), using the basic injection characteristic of a corresponding one of the fuel injectors 30. Specifically, when the absolute value of the actual injection quantity Q has an unacceptable value exceeding the second range, the ECU 50 re-determines the on-duration Tq for use in a subsequent injection event in the injection quantity learning mode in the vicinity of the target quantity Qo to ensure the accuracy in calculating the injection characteristic of a corresponding one of the fuel injectors 30.

While the present invention has been disclosed in terms of the preferred embodiment in order to facilitate better understanding thereof, it should be appreciated that the invention can be embodied in various ways without departing from the principle of the invention. For example, when the absolute value of the actual injection quantity Q corresponding to the reference on-duration Min/MaxTq is out of the second range, the ECU 50 discards the data on the actual injection quantity Q corresponding to the reference on-duration Min/MaxTq, but may alternatively be designed to determine whether the absolute value of the actual injection quantity Q lies within the second range or not each time the value of the actual-to-target quantity deviation ΔQ is derived in step 150. This will be described below with reference to FIG. 4.

Figure 4:
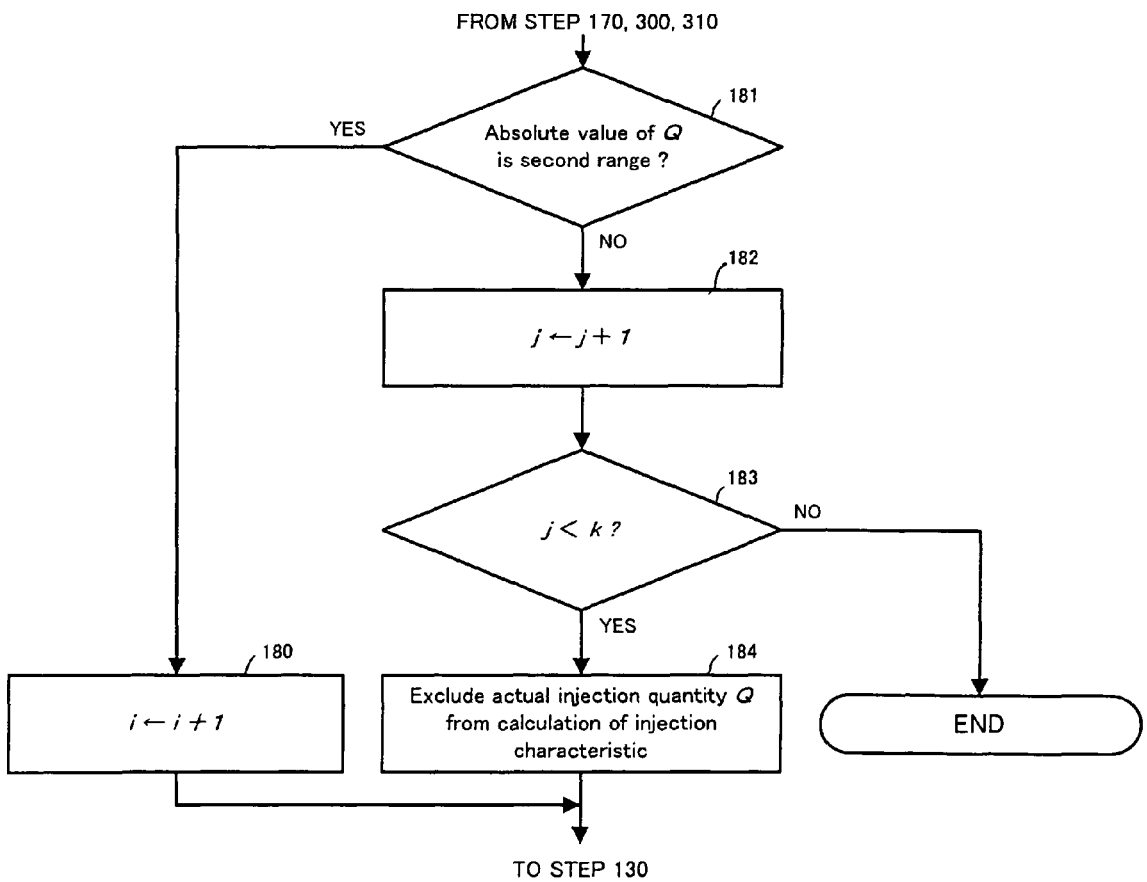
FIG. 4 is a flowchart of a modified sequence of logical steps in the program of FIGS. 2(a) to 2(c)

FIG. 4 shows a sequence of steps which are to be executed before step 180 in FIG. 2(*a*).

Specifically, after step 170, 300, or 310 in FIGS. 2(*a*) and 2(*b*), the routine proceeds to step 181 wherein it is determined whether the absolute value of the actual injection quantity Q as derived last, lies within the second range or not.

If a YES answer is obtained meaning that the absolute value of the actual injection quantity Q is within the second range, then the routine proceeds to step 180 in FIG. 2(*a*) wherein the count value is incremented by one (1). Alternatively, if a NO answer is obtained, then the routine proceeds to step 182 wherein a deviation count value j indicating the number of times the absolute value of the actual injection quantity Q has exceeded the second range is incremented by one (1). An initial value of the deviation count value j is zero (0).

The routine proceeds to step 183 wherein it is determined whether the deviation count value j is smaller than a given value k or not. If a YES answer is obtained, then the routine proceeds to step 184 wherein data on the actual injection quantity Q, as derived in this program cycle, is excluded from calculation of the injection characteristic of a corresponding one of the fuel injectors 30. The routine then proceeds to step 130 of FIG. 2(*a*).

If a NO answer is obtained in step 183 meaning that the deviation count value j is greater than or equal to the value k, it is concluded that a fuel injection mechanism including a corresponding one of the fuel injectors 30 is malfunctioning. The routine then terminates.

As apparent from the above discussion, when the absolute value of the actual injection quantity Q is out of the second range, the ECU 50 excludes results of the learning (i.e., the actual injection quantity Q and the on-duration Tq) from the calculation of the injection characteristic. Further, when the absolute value of the actual injection quantity Q has exceeded the second range several times, the ECU 50 determines that a corresponding one of the fuel injectors 30 or the fuel injection mechanism thereof is malfunctioning and stops the injection quantity learning mode.

When the absolute value of the actual injection quantity Q corresponding to the reference on-duration Min/MaxTq is out of the first range defined around the target quantity Qo, the ECU 50 shifts the reference on-duration Min/MaxTq in the direction opposite the direction (i.e., a regular direction) in which the reference on-duration Min/MaxTq has ever shifted, but may alternatively be designed to search one of the on-durations Tq, as ever derived, which is the closest to (i.e., the second smallest or the second greatest of) the reference on-duration Min/MaxTq and selects the searched one as the on-duration Tq for use in a subsequent injection event in the injection quantity learning mode.

The on-duration Tq to be used first since the injection quantity learning mode is entered is, as described above, set to the basic on-duration Tqo (i.e., an initial value of the on-duration Tq) as predetermined based on the basic injection characteristic of the fuel injectors 30 for spraying the target quantity Qo of fuel, but however, a lower guard value (i.e., a given lower limit) of the on-duration Tq may be used as the initial value thereof. The lower guard value is preselected based on the basic injection characteristic of the fuel injectors 30. This avoids the spraying of an excessive quantity of fuel immediately after the injection quantity learning mode is entered which may result in an undesirable change in speed of the diesel engine 2 with which vehicle occupants usually feel uncomfortable.

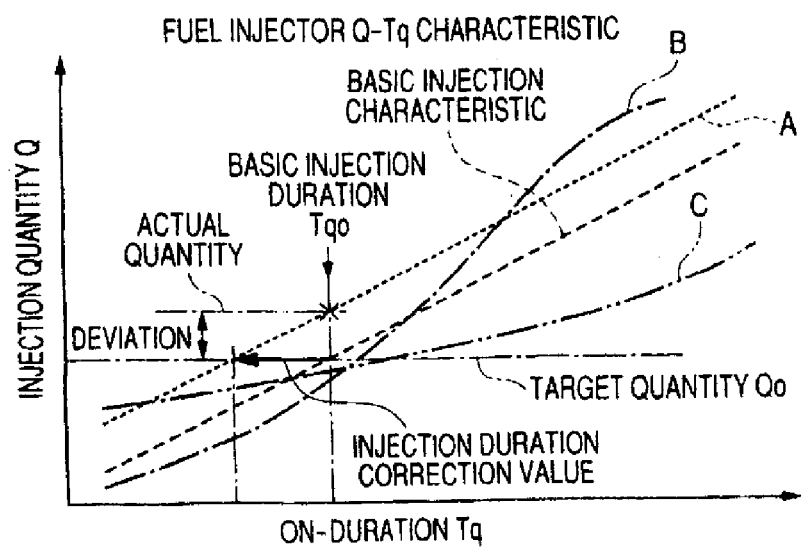

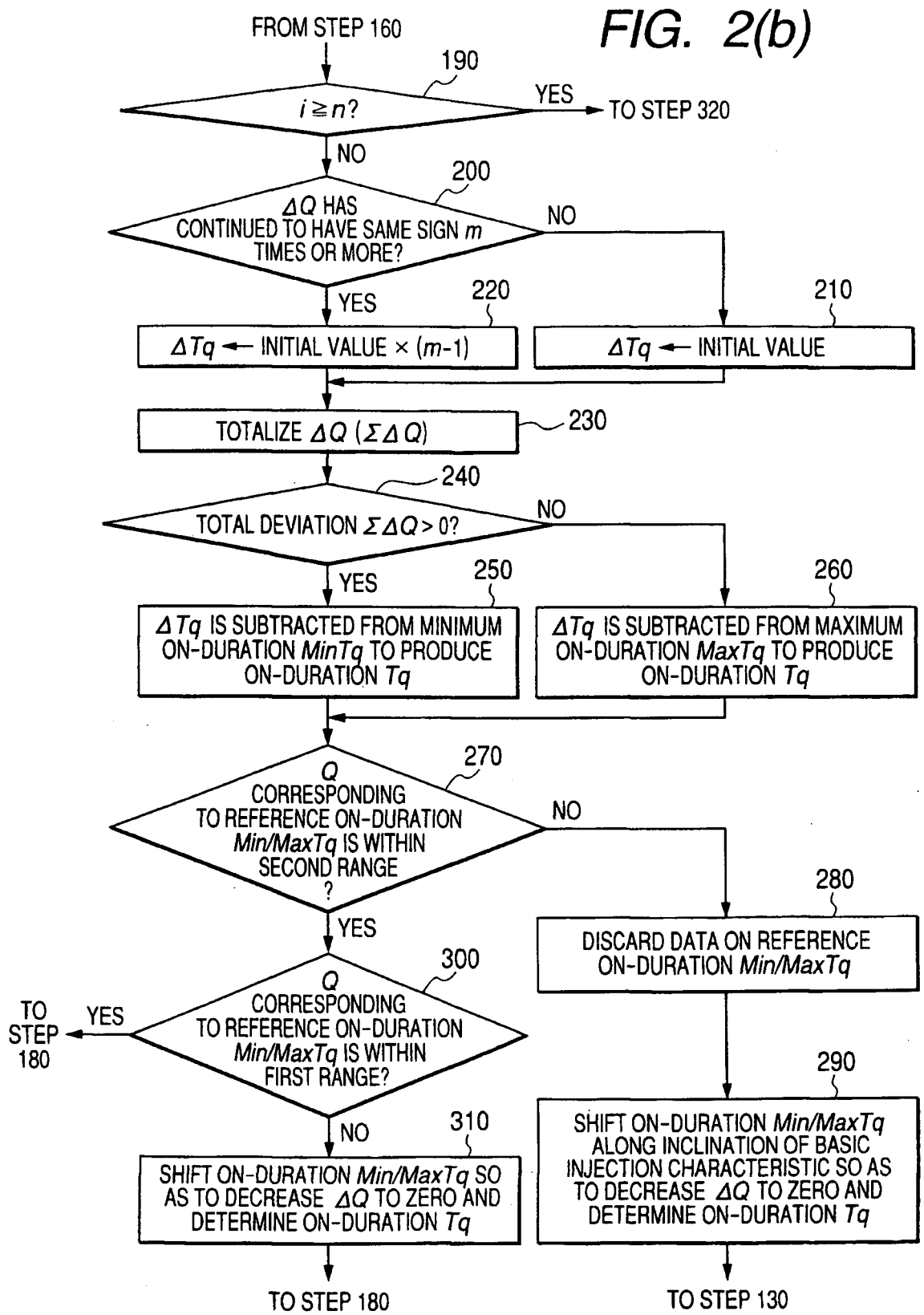

What is claimed is:

1. A fuel injection system for an internal combustion engine comprising:
   a fuel injector working to spray fuel into an internal combustion engine; and
   an injection controller working to perform an injection instruction function when a given learning condition is encountered, the injection instruction function being to instruct said fuel injector to inject the fuel into the internal combustion engine a plurality of times for a given injection duration to learn an injection characteristic representing a relation between an injection duration for which said fuel injector sprays the fuel and a quantity of the fuel actually sprayed from said fuel injector for the injection duration, said injection controller also performing an injection duration changing function, an actual injection quantity determining function, and a correction value determining function, the injection duration changing function being to change the injection duration around a target injection quantity that is a target quantity of the fuel to be sprayed from said fuel injector in each of learning injection events in which said fuel injector is instructed by the injection instruction function to spray the fuel, the actual injection quantity determining function being to monitor a change in operating condition of the internal combustion engine to determine an actual injection quantity that is a quantity of the fuel expected to have been sprayed from said fuel injector in each of the learning injection events, the correction value determining function being to determine the injection characteristic of said fuel injector based on combinations of the actual injection quantities, as determined by the actual injection quantity determining function, and the injection durations for which said fuel injector has sprayed the fuel in the respective learning injection events to calculate an injection duration correction value based on the injection characteristic which is required to correct the injection duration for which said fuel injector is to be instructed to spray the fuel so as to bring a quantity of the fuel to be sprayed from said fuel injector into agreement with the target injection quantity, wherein when an integral average of the actual injection quantities, as determined by the actual injection quantity determining function, is smaller than the target injection quantity, the injection duration changing function defines the greatest of the injection durations, as ever used in the learning injection events, as a reference injection duration and produces the injection duration, which is greater than the reference injection duration, for use in a subsequent one of the learning injection events, and wherein when the integral average of the actual injection quantities is greater than the target injection quantity, the injection duration changing function defines the smallest of the injection durations, as ever used in the learning injection events, as the reference injection duration and produces the injection duration, which is smaller than the reference injection duration, for use in the subsequent one of the learning injection events.

2. A fuel injection system as set forth in claim 1, wherein said injection instruction function works to select a basic injection duration, as determined based on a basic injection characteristic predefined for said fuel injector to spray the target injection quantity, as an initial value of the injection duration for which said fuel injector is to spray the fuel in a first one of the learning injection events.

3. A fuel injection system as set forth in claim 1, wherein said injection instruction function works to select a lower guard value of the injection duration, as determined based on a basic injection characteristic predefined for said fuel injector to spray the target injection quantity, as an initial value of the injection duration for which said fuel injector is to spray the fuel in a first one of the learning injection events.

4. A fuel injection system as set forth in claim 1, wherein when the actual injection quantity, as determined by the actual injection quantity determining function, has continued to be one of greater and smaller than the target injection quantity a given number of times in the learning injection events, the injection duration changing function increases an amount by which the injection duration for use in the subsequent one of the learning injection events is changed.

5. A fuel injection system as set forth in claim 4, wherein the injection duration changing function increases the amount by which the injection duration for use in the subsequent one of the learning injection events is changed with an increase in number of times the actual injection quantity, as determined by the actual injection quantity determining function, has continued to be one of greater and smaller than the target injection quantity.

6. A fuel injection system as set forth in claim 1, wherein when an absolute value of the actual injection quantity corresponding to the reference injection duration has exceeded a first range, said injection duration changing function changes the injection duration in a direction opposite a direction in which the injection duration has been changed last so as to bring the actual injection quantity in the subsequent one of the learning injection events close to the target injection quantity and defines the changed injection duration for use in the subsequent one of the learning injection events.

7. A fuel injection system as set forth in claim 1, wherein when an absolute value of the actual injection quantity corresponding to the reference injection duration has exceeded a first range, said injection duration changing function searches one of the injection durations, as ever used in the learning injection events, which is the closest to the reference injection duration and defines the searched one as the injection duration for use in the subsequent one of the learning injection events.

8. A fuel injection system as set forth in claim 6, wherein when the absolute value of the actual injection quantity corresponding to the reference injection duration has exceeded a second range greater than the first range, said injection duration changing function changes the injection duration so as to bring the actual injection quantity in the subsequent one of the learning injection events toward the target injection quantity and defines the changed injection duration for use in the subsequent one of the learning injection events.

9. A fuel injection system as set forth in claim 7, wherein when the absolute value of the actual injection quantity corresponding to the reference injection duration has exceeded a second range greater than the first range, said injection duration changing function changes the injection duration so as to bring the actual injection quantity in the subsequent one of the learning injection events toward the target injection quantity and defines the changed injection duration for use in the subsequent one of the learning injection events.

10. A fuel injection system as set forth in claim 8, wherein when the absolute value of the actual injection quantity corresponding to the reference injection duration has exceeded the second range, said injection duration changing function corrects the reference injection duration as a function of a ratio of a change in the actual injection quantity to the injection duration defined in a basic injection characteristic predefined for said fuel injector to spray the target injection quantity and defines the corrected reference injection duration as the injection duration for use in the subsequent one of the learning injection events.

11. A fuel injection system as set forth in claim 8, wherein when the absolute value of the actual injection quantity corresponding to the reference injection duration has exceeded the second range, said injection controller works to exclude the actual injection quantity from use in determining the injection characteristic of said fuel injector through the correction value determining function.

12. A fuel injection system as set forth in claim 10, wherein when the absolute value of the actual injection quantity corresponding to the reference injection duration has exceeded the second range, said injection controller works to exclude the actual injection quantity from use in determining the injection characteristic of said fuel injector through the correction value determining function.

13. A fuel injection system as set forth in claim 11, wherein when said injection controller has excluded the actual injection quantity from use in determining the injection characteristic of said fuel injector through the correction value determining function, said injection controller increases the number of times the injection instruction function instructs said fuel injector to spray the fuel to learn the injection characteristic.

14. A fuel injection system as set forth in claim 11, wherein when the number of times the absolute value of the actual injection quantity corresponding to the reference injection duration has exceeded the second range is greater than a given value, said injection controller deactivates the injection instruction function to spray the fuel through said fuel injector.

15. A fuel injection system as set forth in claim 13, wherein when the number of times the absolute value of the actual injection quantity corresponding to the reference injection duration has exceeded the second range is greater than a given value, said injection controller deactivates the injection instruction function to spray the fuel through said fuel injector.

* * * * *

UNITED STATES PATENT AND TRADEMARK OFFICE
CERTIFICATE OF CORRECTION

| | | |
|---|---|---|
| PATENT NO. | : 7,895,990 B2 | Page 1 of 9 |
| APPLICATION NO. | : 12/230454 | |
| DATED | : March 1, 2011 | |
| INVENTOR(S) | : Ishizuka et al. | |

It is certified that error appears in the above-identified patent and that said Letters Patent is hereby corrected as shown below:

Delete the title page showing an illustrative figure and substitute the attached title page therefor.

IN THE DRAWINGS

The attached seven sheets of formal drawings including Figures 1-5 should be substituted for the seven sheets of informal drawings printed with the grant.

Signed and Sealed this
Eleventh Day of October, 2011

David J. Kappos
*Director of the United States Patent and Trademark Office*

(12) United States Patent
Ishizuka et al.

(10) Patent No.: US 7,895,990 B2
(45) Date of Patent: Mar. 1, 2011

(54) FUEL INJECTION SYSTEM WITH INJECTION CHARACTERISTIC LEARNING FUNCTION

(75) Inventors: Kouji Ishizuka, Kariya (JP); Kouichi Sugiyama, Chiryu (JP); Manabu Tsujimura, Anjo (JP); Tetsuya Ohno, Kiyosu (JP)

(73) Assignee: Denso Corporation, Kariya (JP)

( * ) Notice: Subject to any disclaimer, the term of this patent is extended or adjusted under 35 U.S.C. 154(b) by 407 days.

(21) Appl. No.: 12/230,454

(22) Filed: Aug. 28, 2008

(65) Prior Publication Data
US 2009/0063020 A1 Mar. 5, 2009

(30) Foreign Application Priority Data
Aug. 31, 2007 (JP) ............... 2007-226462

(51) Int. Cl.
F02M 51/00 (2006.01)
B60T 7/12 (2006.01)
(52) U.S. Cl. ............... 123/478; 701/103; 701/104
(58) Field of Classification Search ............... 123/478, 123/480, 488, 490; 701/103, 104, 106
See application file for complete search history.

(56) References Cited

U.S. PATENT DOCUMENTS

| | | | | |
|---|---|---|---|---|
| 5,483,945 A * | 1/1996 | Kobayashi et al. | | 123/374 |
| 6,755,176 B2 * | 6/2004 | Takeuchi et al. | | 123/299 |
| 6,988,030 B2 | 1/2006 | Asano et al. | | |
| 6,990,950 B2 | 1/2006 | Asano et al. | | |
| 7,363,912 B2 * | 4/2008 | Asano et al. | | 123/436 |
| 7,599,784 B2 * | 10/2009 | Ishizuka et al. | | 701/104 |
| 2004/0267433 A1 * | 12/2004 | Asano et al. | | 701/104 |

FOREIGN PATENT DOCUMENTS

| | | |
|---|---|---|
| JP | 2005-016486 | 1/2005 |
| JP | 2005-155360 | 6/2005 |

OTHER PUBLICATIONS

Japanese Office Action dated Jun. 30, 2009, issued in corresponding Japanese Application No. 2007-226462, with English translation.

* cited by examiner

*Primary Examiner*—Thomas N Moulis
(74) *Attorney, Agent, or Firm*—Nixon & Vanderhye PC

(57) ABSTRACT

A fuel injection system designed to determine a correction value for correcting the quantity of fuel sprayed from a fuel injector into an internal combustion engine. The fuel injection system instructs the fuel injector to inject the fuel into the engine a plurality of times cyclically to learn an injection characteristic unique to the fuel injector and changes an injection duration for which the fuel is to be sprayed in each of injection events to disperse the injection durations evenly around a target injection quantity, thereby enabling the correction value to be determined in a decreased number of injections of fuel for a decreased amount of time.

15 Claims, 7 Drawing Sheets